United States Patent
Khanin

(10) Patent No.: US 9,657,641 B2
(45) Date of Patent: May 23, 2017

(54) FLUID FLOW MACHINE ESPECIALLY GAS TURBINE PENETRATED AXIALLY BY A HOT GAS STREAM

(71) Applicant: ALSTOM Technology Ltd, Baden (CH)

(72) Inventor: Alexander Anatolievich Khanin, Moscow (RU)

(73) Assignee: General Electric Company, Schenectady, NY (US)

(*) Notice: Subject to any disclaimer, the term of this patent is extended or adjusted under 35 U.S.C. 154(b) by 946 days.

(21) Appl. No.: 13/912,603

(22) Filed: Jun. 7, 2013

(65) Prior Publication Data
US 2013/0263570 A1    Oct. 10, 2013

Related U.S. Application Data

(63) Continuation of application No. PCT/EP2011/072036, filed on Dec. 7, 2011.

(30) Foreign Application Priority Data
Dec. 9, 2010 (RU) ................................ 2010150605

(51) Int. Cl.
*F02C 7/12* (2006.01)
*F01D 5/08* (2006.01)
(Continued)

(52) U.S. Cl.
CPC ................ *F02C 7/12* (2013.01); *F01D 5/084* (2013.01); *F01D 11/001* (2013.01); *F01D 11/02* (2013.01)

(58) Field of Classification Search
CPC ...... F02C 7/12; F02C 7/16; F02C 7/18; F01D 5/08; F01D 5/081; F01D 5/082
See application file for complete search history.

(56) References Cited

U.S. PATENT DOCUMENTS

| | | |
|---|---|---|
| 2,656,147 A | 10/1953 | Brownhill et al. |
| 3,056,579 A | 10/1962 | Bobo |
| (Continued) | | |

FOREIGN PATENT DOCUMENTS

| | | |
|---|---|---|
| CN | 1354820 A | 6/2002 |
| EP | 0 921 273 | 6/1999 |
| (Continued) | | |

OTHER PUBLICATIONS

The Study of the Working Process of Gas Turbine, Cherkasov, p. 26, National Defence Industry Press, published on Feb. 1960.

*Primary Examiner* — Craig Kim
(74) *Attorney, Agent, or Firm* — Charlotte C. Wilson; Ernest G. Cusick; Frank A. Landgraff

(57) ABSTRACT

In a fluid flow machine, especially a gas turbine, axially penetrated by a hot gas stream, the rotor shaft is surrounded by heat shield segments or by base plates of the rotor blades on the rotor side. In the heat shield segments and in the base plates, cooling air chambers are provided, communicating with each other and with a cooling air source, which chambers communicate at least partially with gaps which extend in the longitudinal direction or peripheral direction of the rotor shaft between adjacent rotor blades or between heat shield segments and adjacent base plates of the rotor blades. These gaps are closed off by sealing bands such that a cooling air entry into the hot gas stream is only possible at the ends of the base plates of the rotor blades pointing contrary to the flow direction.

7 Claims, 3 Drawing Sheets

(51) Int. Cl.
*F01D 11/00* (2006.01)
*F01D 11/02* (2006.01)

(56) References Cited

U.S. PATENT DOCUMENTS

| | | | |
|---|---|---|---|
| 3,076,634 | A | 2/1963 | Boyle et al. |
| 4,648,799 | A | 3/1987 | Brown et al. |
| 4,730,983 | A | 3/1988 | Naudet et al. |
| 5,256,035 | A | 10/1993 | Norris et al. |
| 5,630,703 | A | 5/1997 | Handley et al. |
| 6,185,924 | B1 * | 2/2001 | Matsumoto ............. F01D 5/082 415/110 |
| 2002/0076324 | A1 | 6/2002 | Abuaf et al. |
| 2006/0034685 | A1 * | 2/2006 | Kizuka ................... F01D 5/081 415/191 |
| 2007/0237630 | A1 | 10/2007 | Schiavo et al. |

FOREIGN PATENT DOCUMENTS

| | | |
|---|---|---|
| EP | 1 514 999 | 3/2005 |
| EP | 2 053 285 | 4/2009 |
| GB | 905582 A | 9/1962 |
| GB | 988541 | 4/1965 |
| GB | 1358798 | 7/1974 |
| GB | 2 408 296 | 5/2005 |
| JP | S48-037530 | 6/1973 |
| JP | 04-014702 | 2/1992 |
| JP | 04-059301 | 5/1992 |
| JP | H09-13902 | 1/1997 |
| JP | H10-317907 | 12/1998 |
| JP | 2001-123802 | 5/2001 |
| WO | 2007/063128 | 6/2007 |

* cited by examiner

FLUID FLOW MACHINE ESPECIALLY GAS TURBINE PENETRATED AXIALLY BY A HOT GAS STREAM

TECHNICAL FIELD

The invention relates to a fluid flow machine especially gas turbine penetrated axially by the hot gas stream.

BACKGROUND

Such machines have respectively rows of rotor blades on the rotor side and guide vanes on the housing side. The blades of each row are respectively arranged adjacent to each other in the peripheral direction of the rotor shaft. Here, the rotor shaft is surrounded in the region of the guide vanes with heat shield segments and in the region of the rotor blades by base segments of the rotor blades. These segments have anchors which are typically held in a form-fitting manner in longitudinal channels of the rotor shaft, which generally have a profile similar to a fir tree in the axial view of the rotor shaft and can be inserted axially into longitudinal channels of the rotor shaft having a complementary fir tree-shaped profile.

In order to protect the rotor shaft from thermal overload, first cooling air chambers are arranged inside the heat shield- and base segments in the region of a first virtual peripheral plane of the rotor shaft, which communicate with each other and with a cooling air source. In the region of a radially outer second virtual peripheral plane of the rotor shaft, further cooling air chambers are arranged regularly inside base plated of the rotor blades on the base side, which are able to be vented into the hot gas stream.

In modern gas turbines, the highest possible efficiencies are aimed for, in order to make possible an economically optimal operation.

SUMMARY

In this context, uncontrolled inflows of cooling air into the hot gas stream are undesirable, because the efficiency is thereby regularly reduced.

It is an object of the invention to optimize the flow path of the cooling air and to avoid losses to efficiency by the entry of cooling air into the hot gas stream.

This problem is solved according to the invention in a fluid flow machine of the type named in the introductory clause of claim 1 in that the further cooling air chambers are able to be vented into the hot gas stream exclusively at their ends situated upstream of the rotor blades with respect to the direction of the hot gas stream. In contrast to turbines hitherto, in which the further cooling air chambers are able to be vented in front and behind the rotor blades in the flow direction of the hot gas, in the invention a venting is only possible upstream of the rotor blades, and namely preferably respectively between adjacent rotor blades. Owing to this measure, an optimum efficiency of the fluid flow machine can be achieved.

Apart from the above-mentioned inflow of the cooling air into the hot gas stream, further inflows of cooling air are prevented according to the invention.

For this, according to a preferred embodiment of the invention provision is made that seals which shut off the first cooling air chambers are arranged in gaps between adjacent heat shield- and/or base segments in the peripheral direction or in the axial direction of the rotor shaft.

In addition, preferably additional seals are provided on gaps between adjacent base plates of a row of rotor blades extended in the axial direction of the rotor shaft, which prevent an outlet of cooling air between the axial ends of the respective gap and at the end of this gap situated downstream.

If applicable, the first seals can be dispensed with in the region of these additional seals.

Preferably, all the seals are constructed as sealing bands, which are arranged with their longitudinal edges in grooves, lying opposite each other, in the side walls of the respective gap. In the first seals, a sealing band of a gap extended in the axial direction of the rotor shaft between base- or heat shield segments adjacent in peripheral direction can be connected respectively in a T-shape with a sealing band of a gap, extended in the peripheral direction of the rotor shaft, which remains between axially adjacent base- and heat shield segments.

In addition, in a preferred manner, provision is made that slit openings, extended in radial direction, of a gap between adjacent base plates of the rotor blades are closed off by sealing bands, which are arranged in a direction, inclined to a radial plane of the rotor shaft, in corresponding grooves of the side walls of the gap, wherein the end of the sealing band closer to the rotor axis is accessible at the end surfaces of the base plates situated downstream.

Here, the end of the above-mentioned sealing band closer to the rotor axis can be bent and cooperate by its concave side with correspondingly convex stops on the base plates delimiting the gap. In this way it can be prevented that the above-mentioned sealing band is displaced radially outwards during operation of the fluid flow machine owing to centrifugal forces and can collide in a destructive manner with a sealing band between the base plates, extended in the axial direction of the rotor shaft.

Further, with regard to preferred features of the invention, reference is to be made to the claims and to the following explanation of the drawings, by means of which a particularly advantageous embodiment of the invention is described in further detail.

Protection is claimed not only for indicated or illustrated combinations of features, but also for in principle any desired combinations of the indicated or illustrated individual features.

DETAILED DESCRIPTION

Figure 1:
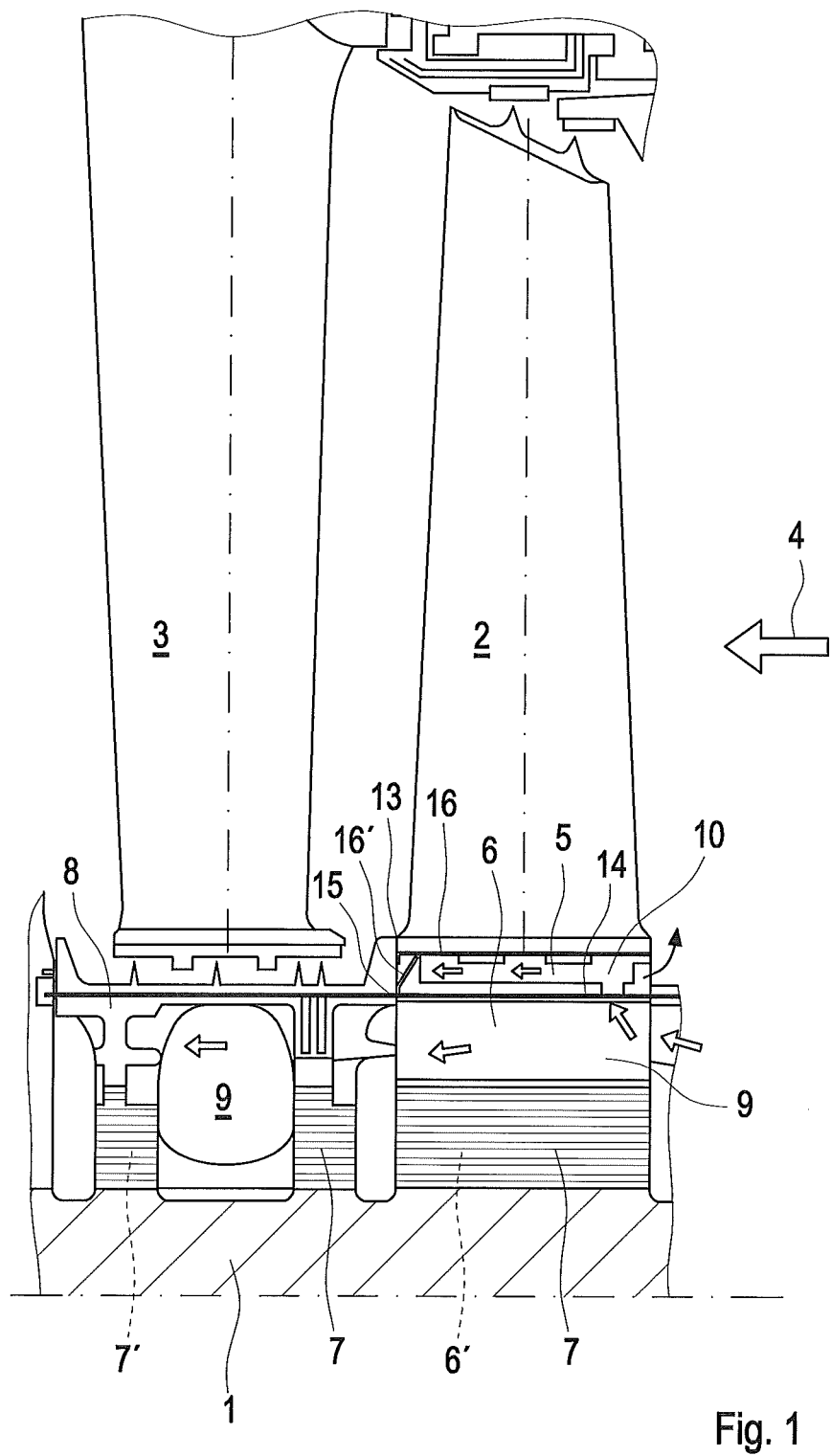
FIG. 1 shows a partial axial section of a gas turbine, which is flowed through axially.

According to FIG. 1, each rotor stage has rotor blades 2 arranged on the rotor shaft 1, and guide vanes 3 on the housing side, arranged in a stationary manner in front of and behind the rotor blades 2 in the axial direction of the rotor shaft 1. In FIG. 1 only one rotor blade 2 can be seen axially between a guide vane, arranged upstream with respect to the direction of the hot gas stream 4, and a further guide vane 3 arranged downstream with respect to the hot gas stream 4.

However, it is clear that both the guide vanes 3 and also the rotor blades 2 are arranged adjacent to each other respectively in several numbers in the peripheral direction of the rotor shaft. Both the rotor blades 2 and also the guide vanes 3 therefore form corresponding rows of blades/vanes in the peripheral direction of the rotor shaft 1.

The rotor blades 2 have respectively a base plate 5, adjoining the radially inner end of the rotor blade 2, the outer surface of which on the blade side extends in the peripheral direction and axial direction of the rotor shaft 1. The base plate 5 continues radially inwards into a base segment 6, which has a fir tree-shaped anchor 6' in the axial view of the rotor shaft 1, which can be inserted axially into channels, shaped in a correspondingly complementary manner, between (segmented) longitudinal ribs 7 on the rotor shaft 1. Thereby, the anchors 6' and the base segment 6 belonging thereto, and the associated base plate 5 are secured on the rotor shaft 1 in a form-fitting manner in radial direction with the respective rotor blade 2.

In the region of the ends of the guide vanes 3 on the rotor shaft side, heat shield segments 8 are arranged on the rotor shaft 1, which are largely similar to the base segments 6 and are secured in a form-fitting manner on the rotor shaft with similar anchors 7' to the anchors 6'.

Like the rotor blades 2, the base segments 6 with the base plates 5, and the heat shield segments 8 are arranged respectively in peripheral rows adjacent to each other on the rotor shaft 1.

Figure 2:
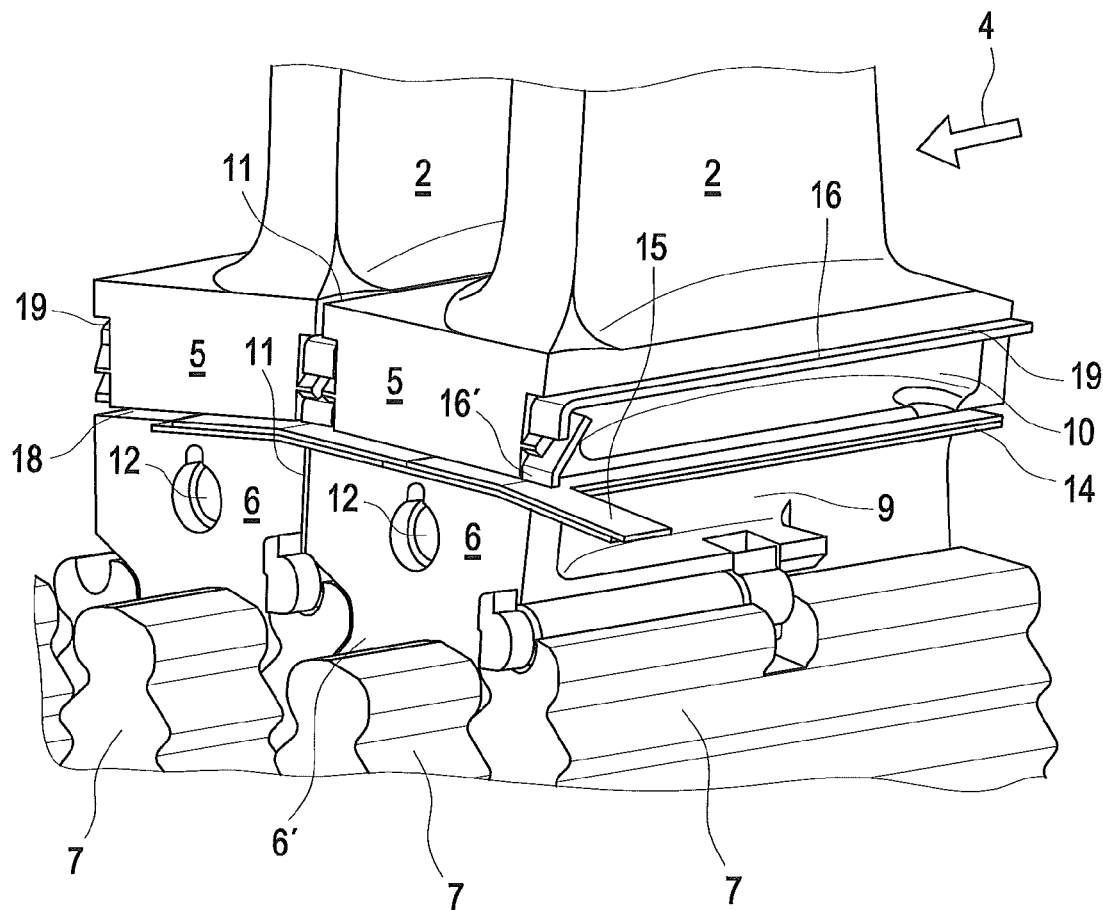
FIG. 2 shows a perspective illustration of the base segments of adjacent rotor blades on a partially illustrated rotor shaft.
Figure 3:
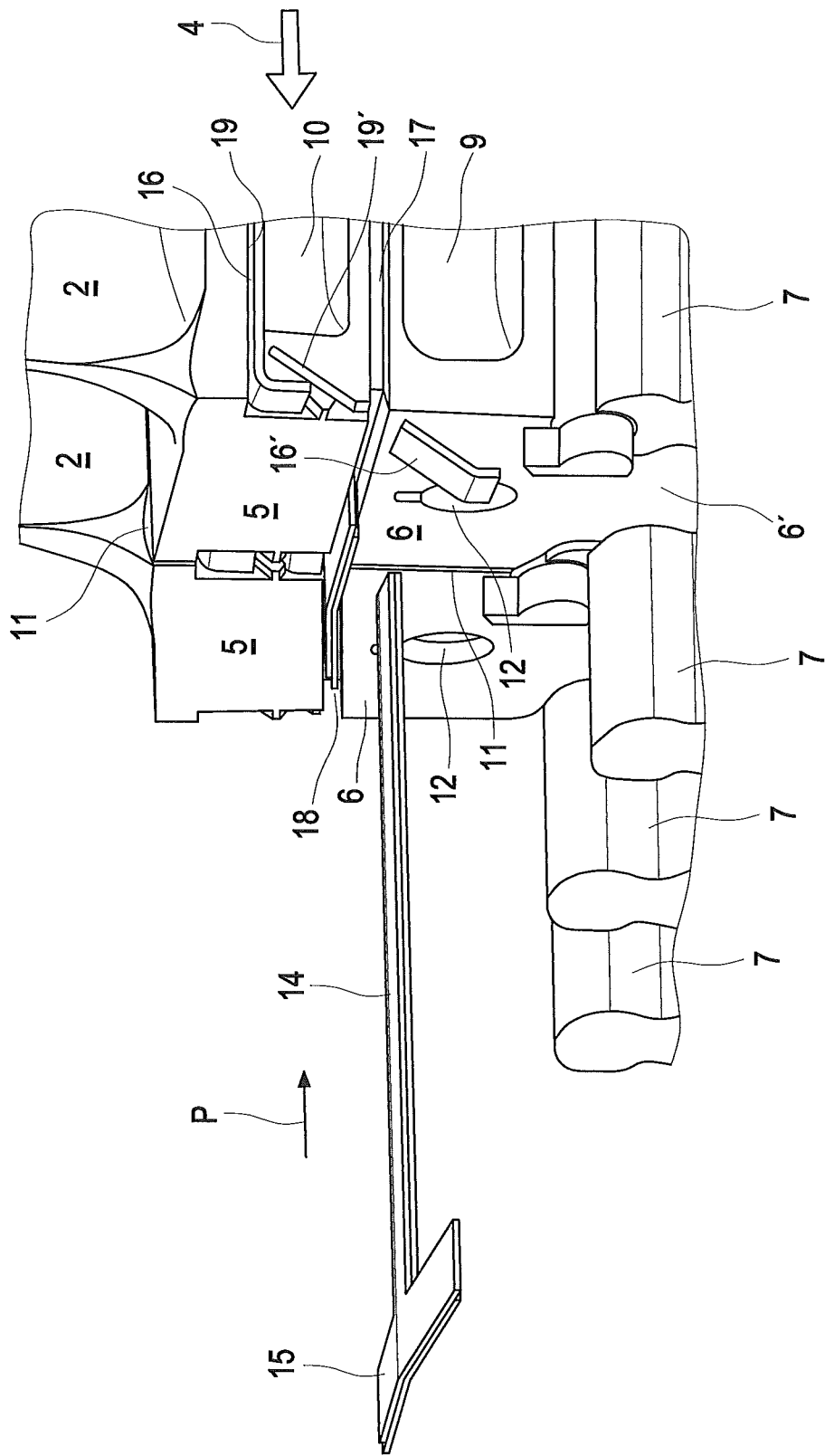
FIG. 3 shows a further perspective illustration of the above-mentioned base segments.

As becomes clear from FIGS. 1 to 3, cooling air chambers 9, communicating with each other and with a cooling air source, which is not illustrated, are constructed in the base- and heat shield segments 6 and 8, in order to be able to protect the rotor shaft against thermal overload by a cooling air stream penetrating the cooling air chambers 9. These cooling air chambers 9 are provided in the region of a radially inner peripheral plane of the rotor shaft. Inside the base plates 5 and hence inside a radially outer peripheral plane of the rotor shaft 1, further cooling air chambers 10 are situated, which communicate with the cooling air chambers 9 in the base segments 6. As can be seen in particular from FIGS. 2 and 3, the cooling air chambers 9 and 10 extend in axial view of the rotor shaft 1 respectively between adjacent rotor blades 2. Accordingly, the cooling air chambers 9 and 10 are penetrated by gaps 11, extended in the longitudinal direction of the rotor shaft 1, between the base plates 5 and the base segments 6 of the adjacent rotor blades 2. Furthermore, the cooling air chambers 9 of the base segments 6 are connected with the cooling air chambers 9 of the adjacent heat shield segments 8 via openings 12 (cf. FIG. 2), which are arranged on the end faces, facing each other, of adjacent heat shield segments 8 and base segments 6 in the axial direction of the rotor shaft 1. The cooling air paths leading through these openings are penetrated respectively by gaps 13, which are present between the above-mentioned end faces of the axially adjacent base- and heat shield segments 6 and 8.

Provision is now made according to the invention that cooling air from the cooling air chambers 9 or respectively 10 can only pass over into the hot gas stream 4 at the face ends of the base plates 5 pointing in the upwards direction of the hot gas stream 4. This passing over of cooling air takes place at the ends of the gaps 11 between adjacent rotor blades 2 in the opposite direction to the hot gas stream 4. Furthermore, an outlet of cooling air at the gaps 11 and 13 is prevented by sealing bands 14 to 16, which are respectively constructed in the manner of flat bands and are arranged with their longitudinal edges in grooves, lying opposite each other, on the side- or end faces of the heat shield segments 8 and base segments 6 or respectively the base plates 5 delimiting the gaps 11 and 13.

As FIGS. 2 and 3 show, in the gaps 11 between the cooling air chambers 9 and 10, sealing bands 14 are arranged in grooves 17 on the walls of the adjacent base segments 6 delimiting the gap 11. These sealing bands 14 are respectively connected in a T-shape with sealing bands 15, of which longitudinal edges are arranged in grooves 18 on the end faces, facing each other, of axially adjacent base- and heat shield segments 6 and 8. After mounting of adjacent base segments 6 with the associated rotor blades 2 on the rotor shaft 1, therefore a T-shaped combination of a sealing band 14 and 15 according to FIG. 3 can therefore be inserted respectively in arrow direction P into the respective desired position, in which the respective sealing band 14 is arranged between adjacent base segments 6 in the grooves 17 and the sealing band 15 is arranged in the grooves 18 on the end faces of the adjacent base segments 6 pointing in the flow direction of the hot gas stream 4. As soon as the heat shield segments, adjacent to the already mounted base segments 6 in the flow direction of the hot gas stream 4, are then mounted on the rotor shaft, the free longitudinal edge of the sealing band 15 automatically engages into the corresponding groove 18 on the heat shield segments 8. A passing over of cooling air out from the cooling air chambers 9 via the gaps 11 and 13 into the hot gas stream 4 is therefore prevented by the sealing bands 14 and 15. Additional sealing bands 16 and 16' are arranged so that cooling air can emerge out from the cooling air chambers 10 only via the end of the gap 11, in the opposite direction to the hot gas stream 4, between adjacent base plates 5 or respectively rotor blades 2. The sealing band 16 is respectively inserted in grooves 19 which extend parallel to the grooves 17 of the sealing bands 14. The end of the sealing bands 16, situated downstream in the flow direction of the hot gas stream 4 is bent or angled, as can be seen from FIGS. 2 and 3, and cooperates by its concave side with correspondingly convex stops on the base plates 5, so that the desired position of the sealing band 16 is formed as an end position and the angled end is arrested between end faces, facing each other, of a base segment 6 and of an axially adjacent heat shield segment 8.

Figure 4:
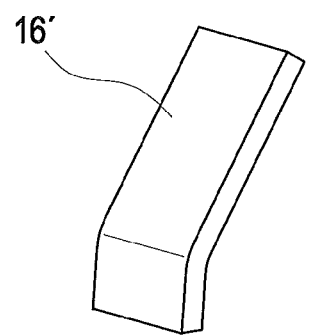
FIG. 4 shows an enlarged illustration of one of the sealing bands.

In addition, additional sealing bands 16' are provided on the ends of the gaps 11 pointing in the flow direction of the hot gas stream 4, which are arranged obliquely to a radial plane of the rotor shaft 1 in the manner which can be seen in FIG. 3 into correspondingly oblique grooves 19' on the side faces of the adjacent base plates 5 delimiting the respective gap 11. The radially inner end of the further sealing bands 16' is bent downwards according to FIG. 4 and cooperates by its concave side with edges, formed in a correspondingly complementary manner, on the adjacent side faces of the adjacent base plates 5. Thereby, the desired position of the further sealing band 16' is also constructed as an end position, and namely such that a minimal gap remains between the upper end, in FIGS. 2 and 3, of the further sealing band 16' and the adjacent sealing band 16, so that a destructive contact between the sealing bands 16 and 16' is prevented and practically no cooling air at all can escape between these two sealing bands 16 and 16'. In its desired position, the sealing band 16' does not contact with sealing band 16 and does not destroy sealing band 16. Said sealing band 16' is in its desired position respectively arrested by a sealing band 15. Accordingly, the sealing band 16' according to FIG. 3 is pushed into its desired position, before the sealing band 15, belonging thereto, is mounted with the sealing band 14, connected therewith in a T-shape.

What is claimed is:

1. A fluid flow machine penetrated axially by a hot gas stream, the fluid flow machine comprising:

a rotor shaft;

rows of rotor blades, each rotor blade having a base segment attached to the rotor shaft, a base plate radially outward of the base segment, and an airfoil extending radially outward of the base plate, wherein adjacent rotor blades in a respective row define therebetween a first gap;

rows of guide vanes on a housing side, the guide vanes being arranged respectively axially between successive rows of rotor blades;

heat shield segments attached to the rotor shaft opposite ends of the guide vanes, the heat shield segments being located between the base segments, wherein a second gap is defined between respective ones of the heat shield segments and respective ones of the adjacent base segments;

wherein first cooling air chambers are formed along the rotor shaft inside the heat shield segments and base segments, the first cooling air chambers communicating with each other and with a cooling air source;

wherein second cooling air chambers are arranged radially outward of the first cooling air chambers inside the base plates between the rotor blades;

wherein each of the base plates defines, along a side surface thereof, a first axial groove and a second oblique groove, the second oblique groove being oblique to a radial plane of the rotor shaft; and wherein a first sealing band is inserted in the first axial groove and a second sealing band is inserted in the second oblique groove in a radially inwardly oriented position, such that the second cooling air chambers are able to be vented into the hot gas stream exclusively at their ends situated upstream with respect to the direction of the hot gas stream.

2. A fluid flow machine according to claim 1, further comprising third sealing bands positioned between adjacent base segments in the axial direction of the rotor shaft.

3. A fluid flow machine according to claim 2, wherein each of the base plates defines, along the side surface thereof, a third groove parallel to the first axial groove; and wherein the third sealing bands are inserted in the third grooves.

4. A fluid flow machine according to claim 2, further comprising fourth sealing bands provided in a fourth groove in an end face of the rotor blade between the base segment and the base plate.

5. A fluid flow machine according to claim 4, wherein each of third sealing bands and each of the fourth sealing bands are connected with each other in a T-shape.

6. A fluid flow machine according to claim 2, wherein each of the second sealing bands has an end proximate to the rotor shaft, the end being accessible at downstream end faces of the base plates.

7. A fluid flow machine according to claim 6, wherein the ends of the second sealing bands proximate to the rotor shaft are bent to form concave sides, the concave sides cooperating with correspondingly convex stops on the base plates.

* * * * *